United States Patent [19]

Hanai

[11] Patent Number: 5,541,670
[45] Date of Patent: Jul. 30, 1996

[54] ELECTRIC APPARATUS AND CONNECTOR

[75] Inventor: Tomoyuki Hanai, Kanagawa, Japan

[73] Assignee: Sony Corporation, Tokyo, Japan

[21] Appl. No.: 447,615

[22] Filed: May 23, 1995

[30] Foreign Application Priority Data

May 31, 1994 [JP] Japan .................... 6-118817

[51] Int. Cl.⁶ .................................................. H24N 5/268
[52] U.S. Cl. .................... 348/705; 340/825.51; 340/827; 395/200.05; 395/294
[58] Field of Search .............................. 348/13, 706, 722, 348/738, 705, 10, 11, 12, 6; 358/343, 335; 370/85.1, 92, 110.1; 364/184, 185; 340/825.03, 825.25, 825.24, 825.51, 827; 307/112, 243, 244; 395/732, 741, 200.05, 294, 296, 311, 312; H04N 5/268, 7/16

[56] References Cited

U.S. PATENT DOCUMENTS

| | | | |
|---|---|---|---|
| 4,808,992 | 2/1989 | Beyers, Jr. et al. | 348/706 |
| 5,054,022 | 10/1991 | Van Streenbrugge | 348/706 |
| 5,305,355 | 4/1994 | Go et al. | 340/825.04 |
| 5,414,417 | 5/1995 | Heo | 348/706 |
| 5,457,446 | 10/1995 | Yamamoto | 340/825.25 |

FOREIGN PATENT DOCUMENTS 3120973   5/1991   Japan .............................. H04N 5/268

Primary Examiner—Safet Metjahic
Assistant Examiner—Jeffrey S. Murrell
Attorney, Agent, or Firm—Jay H. Maioli

[57] ABSTRACT

A connector that has three input/output ports and that can connect any two of the ports is used with a cable box that selects a channel from a CATV signal for a VCR and a TV, which also have respective connecting portions for inputting and outputting an audio signal, a video signal, and control data. The connecting portions of the video equipment are connected by a cable and a connector, so that the cable box, the VCR, and the TV are linked to each other. Each of the cable box, the VCR, and the TV can be set to a category such as "master", to control equipment, or "slave", to be under control, and also can be set to determine the order of priority. The "master" equipment with the highest priority determines the addresses for each unit of the equipment based on such categories. The "master" equipment can control each unit of the equipment using the addresses.

12 Claims, 10 Drawing Sheets

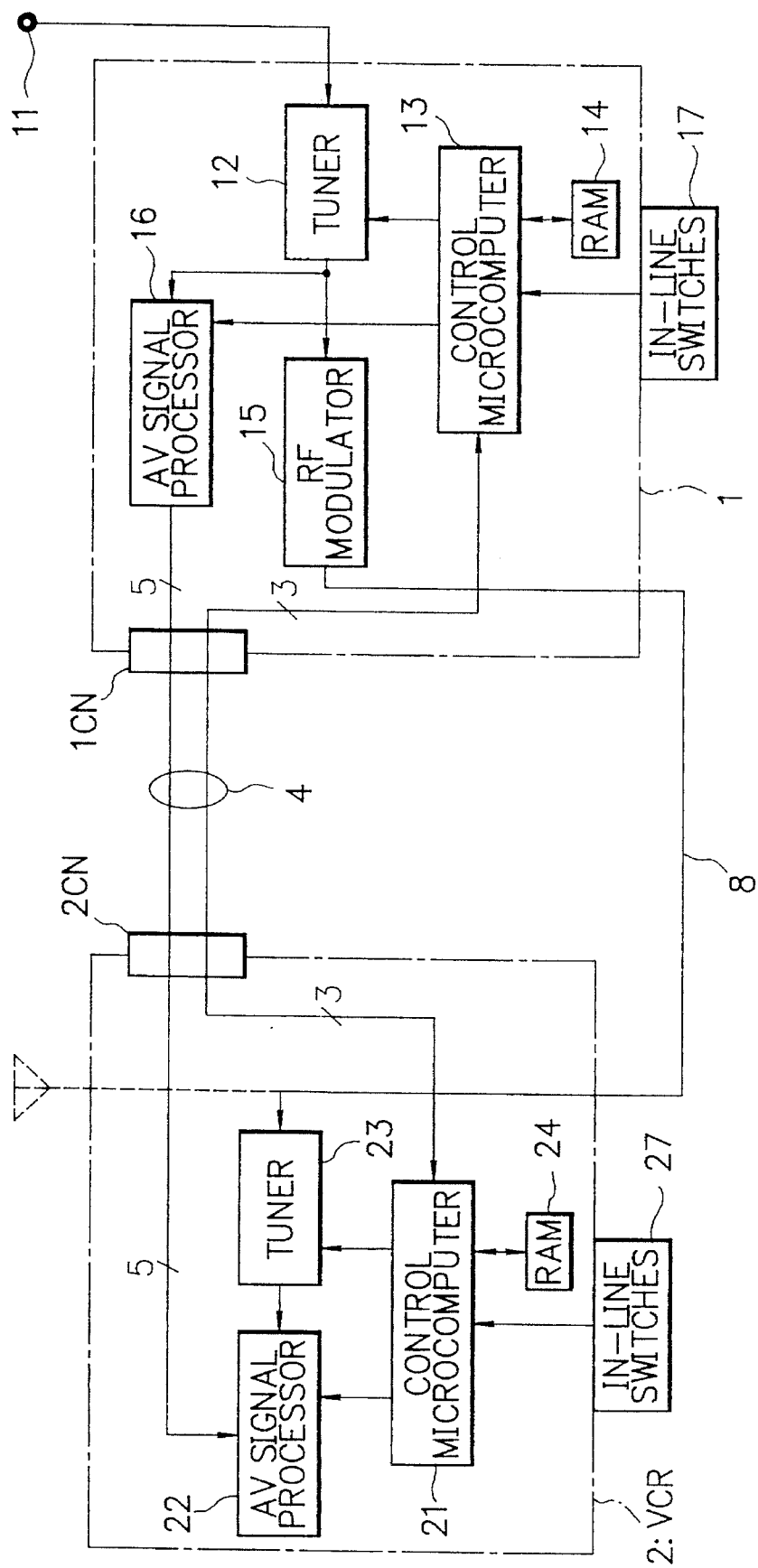

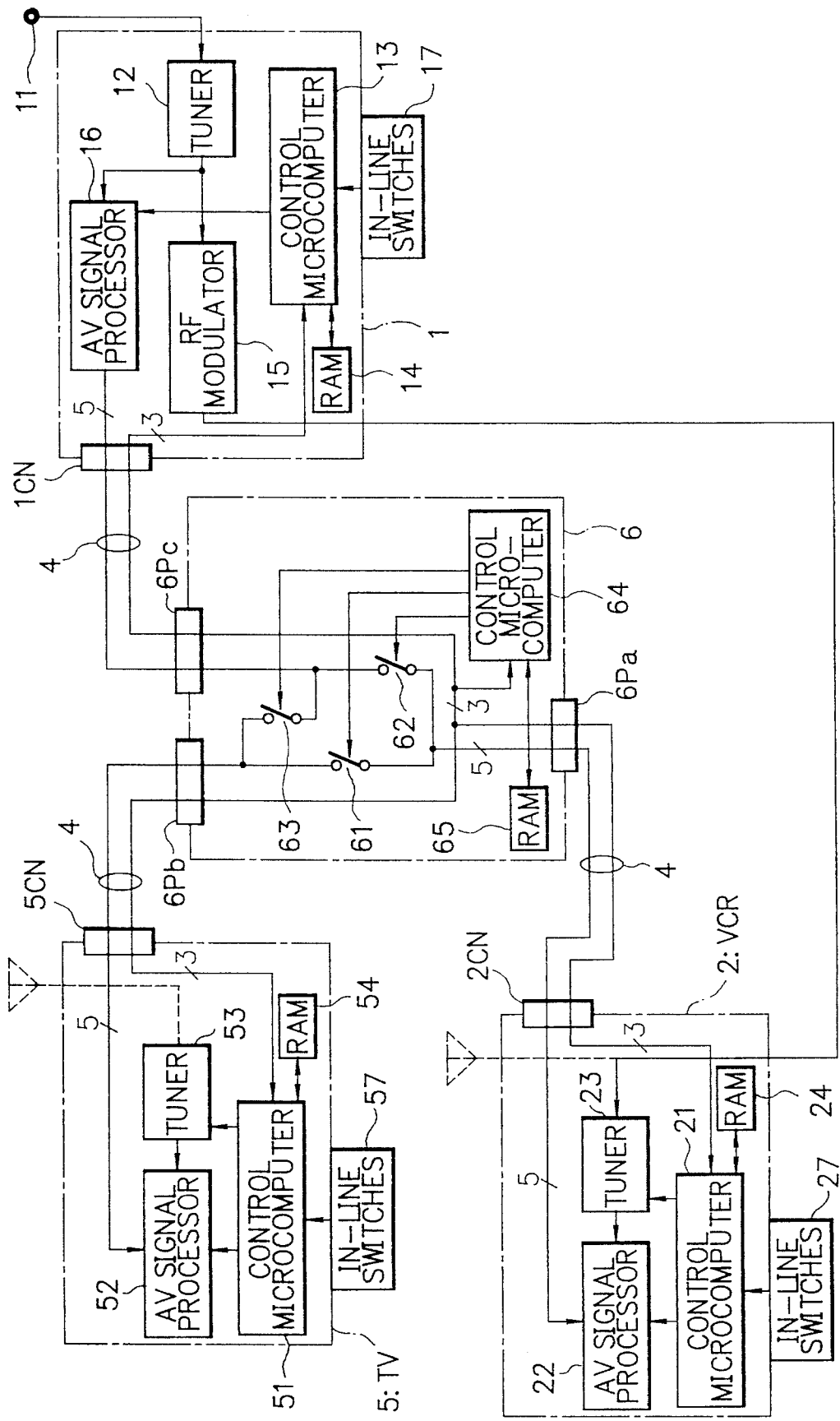

FIG. 5

| | TYPE | CATEGORY | ADDRESS |
|---|---|---|---|
| VCR2 | VCR | MASTER (1) | 1 |
| TELEVISION RECEIVER 5 | TELEVISION RECEIVER | MASTER (2) | 2 |
| CABLE BOX 1 | CABLE BOX | SLAVE | 3 |
| CONNECTOR 6 | CONNECTOR | SLAVE | 4 |

| | TYPE | CATEGORY | ADDRESS |
|---|---|---|---|
| VCR 2 | VCR | MASTER (1) | 1 |
| TELEVISION RECEIVER 5 | TELEVISION RECEIVER | MASTER (2) | 2 |
| CABLE BOX 1 | CABLE BOX | SLAVE | 3 |
| SWITCH BLOCK 70 | SWITCH BLOCK | SLAVE | 4 |
| CONNECTOR 6A | CONNECTOR | SLAVE | 5 |
| CONNECTOR 6B | CONNECTOR | SLAVE | 6 |

F I G. 11

| | TYPE | CATEGORY | ADDRESS |
|---|---|---|---|
| VCR 2A | VCR | MASTER (1) | 1 |
| TELEVISION RECEIVER 5 | TELEVISION RECEIVER | MASTER (2) | 2 |
| VCR 2B | VCR | MASTER (3) | 3 |
| CABLE BOX 1 | CABLE BOX | SLAVE | 4 |
| SATELLITE DECODER 80 | SATELLITE DECODER | SLAVE | 5 |
| NEW MEDIUM 90 | NEW MEDIUM | SLAVE | 6 |
| CONNECTOR 6A | CONNECTOR | SLAVE | 7 |
| CONNECTOR 6B | CONNECTOR | SLAVE | 8 |
| CONNECTOR 6C | CONNECTOR | SLAVE | 9 |
| CONNECTOR 6D | CONNECTOR | SLAVE | 10 |

ELECTRIC APPARATUS AND CONNECTOR

BACKGROUND OF THE INVENTION

1. Field of the Invention

The present invention relates generally to a connector system for connecting units in an audio/video (AV) system and, more particularly, to a connector system in which the connector includes a microcomputer controlling switches for connecting the various units of AV equipment.

2. Description of Related Art

FIG. 12 illustrates an already known receiver system for a CATV signal, in which a cable box 1 selects a channel and descrambles the CATV signal. The CATV signals for the channels are transmitted through a cable (not shown) and supplied via an input terminal 11 to a tuner 12, which selects a channel under control of a control microcomputer 13 and outputs the signals of the selected channel. The tuner 12 includes a descrambler for descrambling a scrambled video signal.

A remote-control receiver 14 receives a remote control signal in the form of an infrared ray signal from an infrared ray radiator that is described below. The remote control receiver 14 provides information relating to a selected channel and power on-off to the control microcomputer 13.

The video signal output by the tuner 12 is supplied to an RF modulator 15 that converts it into a set channel of the broadcast signal, such as channel 3 or channel 4, and supplies it to a video cassette recorder 2 (VCR) for video recording. A cable box control driver 7 in the VCR 2 directs the infrared ray radiator 3 to supply a predetermined remote control signal to the cable box 1, so that the VCR 2 can control the power on-off operation and the channel selection of the cable box 1. Such an infrared ray radiator is sometimes referred to as a "cable mouse."

In the receiver system for a CATV signal described above, the VCR 2 and a television receiver (not shown) would each receive the CATV signal directly and simultaneously from the cable box 1. This leads to the possibility of changing the channel selected by the tuner 12 in the cable box 1 with the television controls, and therefore changing the channel being recorded by the VCR 2 when the VCR 2 is in a recording mode, which would create a problem for accurate recording.

In the case of pre-set video recording, the VCR 2 supplies a predetermined remote control signal through the infrared ray radiator 3 to the cable box 1 in order to direct the power on-off operation and channel selection. However, because the VCR 2 cannot recognize the status, such as power on-off, selected channel, scrambling, etc., of the cable box 1, the VCR 2 cannot control the cable box 1 completely. Furthermore, the cable box does not have a timer, so that the timer in the VCR must be used.

OBJECTS AND SUMMARY OF THE INVENTION

It is an object of the present invention to provide an improved connector system that overcomes the defects inherent in the previously proposed systems.

It is another object of the present invention to provide an improved connector system that can be used together by a VCR and a television receiver and which allows the VCR and the television receiver to control a cable box completely.

According to one aspect of the present invention, a number of units of electronic equipment for handling information signals, such as audio or video signals, are each provided with a connecting portion for inputting and outputting the information signals and control data, and the connecting portions of the electronic equipment are connected with each other by a cable.

In another aspect of the present invention, each item of electronic equipment has a category setting means for setting the electronic equipment in a "master" category that can control the other equipment or a "slave" category that cannot control the other equipment, and the category setting means also determines priorities in the event more than one unit of equipment is set as a "master". The category setting means may be made up of an in-line package switch or DIP switch.

According to the present invention the electronic equipment which is set as "master" and which has been set at the highest priority by the category setting means determines the addresses for the electronic equipment using the cable, in reference to the categories and the priorities for the other equipment. In addition, a warning means for warning of duplication in the order of priority which is set for the electronic equipment is also provided.

A connector according to an aspect of the present invention is comprised of first to third input/output ports and a switching means for connecting any two of the first to third input/output ports.

The present invention is intended for use with a plurality of electronic equipment units for handling information signals such as audio or video signals. Each unit of the electronic equipment has a connecting portion for inputting and outputting the information signals and control data, in which the connecting portions of the electronic equipment are connected with each other by a cable and a connector, and the connector has first to third input/output ports and a switching means for connecting any two of the first to third input/output ports.

According to an aspect of the present invention, each unit of the electronic equipment has a connecting portion for connecting it to the others in order to input and output information and control data, whereby the equipment are easily linked to each other. The electronic equipment can send and receive the control data, so that one unit of the electronic equipment can easily share information and control data with the other units and, in addition, such one unit of electronic equipment can recognize the status of and control the other units completely, not just in regard to on/off operation and channel selection.

According to another aspect of the present invention, a unit of electronic equipment can set each other unit of the electronic equipment in either the category "master", which can control the other units, or the category "slave", which cannot control the other units. Moreover, each unit of electronic equipment that is set as a "master" can be set to have an order of priority, so that when a number of units of electronic equipment are connected together the relationship of "master" and "slave" will be clear, and it will be possible to avoid confusion concerning control of the electronic equipment.

According to the present invention, the categories and the priorities are determined through an in-line package (DIP) switch, so that it is possible to set these manually and to permit the user to see what has been set.

In addition, a "master" unit of electronic equipment set with the highest priority determines the addresses for a number of electric equipment units using a cable, in reference to the categories and the priorities for the other equipment, so that it is possible to handle a number of units of electronic equipment with such addresses.

According to the present invention, a user is warned of duplication in the order of priority for the electronic equipment, so that a user is informed of his or her error in setting the priorities.

A connector according to the present invention has first to third input/output ports and a switch means for connecting any two of the first to third input/output ports, so that more than three items of electronic equipment can be connected with each other using more than one connector. Also, when one of the first to third input/output ports is not actually used, the two other input/output ports are connected with each other, so that the two other input/output ports are prevented from being isolated.

According to the present invention, each unit of electronic equipment has a connecting portion for inputting and outputting the information signals and control data, and the connecting portions of the electronic equipment are connected with each other by a cable and the connector. The connector has first to third input/output ports and a switch means for connecting any two of the first to third input/output ports, so that more than three items of electric equipment can be connected with each other using more than one connector.

BRIEF DESCRIPTION OF THE DRAWINGS

FIG. 2 is a diagram illustrating the first embodiment of FIG. 1 in more detail;

FIG. 4 is a diagram illustrating the second embodiment of FIG. 3 in more detail;

FIG. 5 is a diagram illustrating an example of the setting of categories and addresses in the second embodiment;

FIG. 11 is a diagram illustrating an example of the setting of categories and addresses in the fourth embodiment.

DETAILED DESCRIPTION OF PREFERRED EMBODIMENTS

Figure 1:
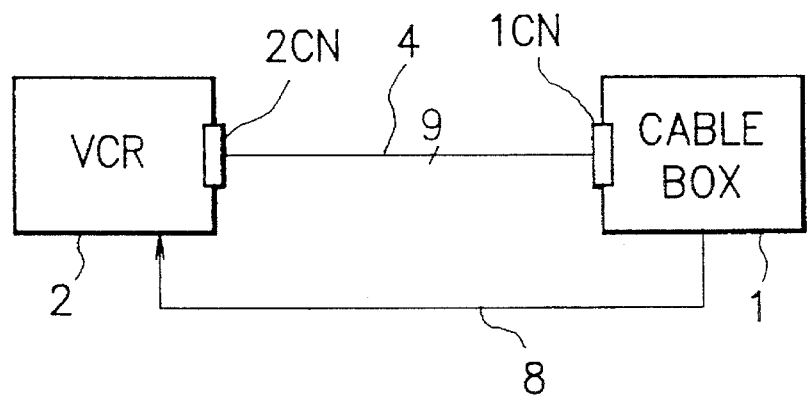
FIG. 1 is a diagram illustrating a construction of a first embodiment according to the present invention.
Figure 12:
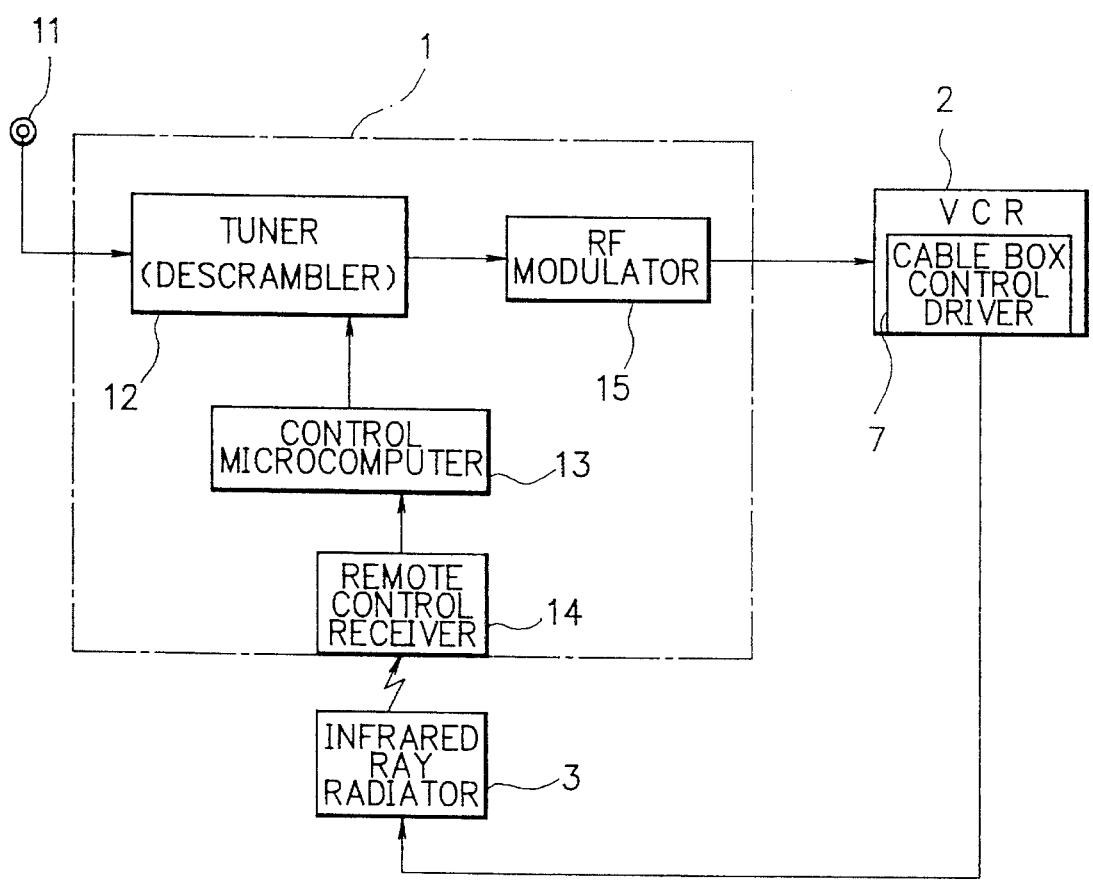
FIG. 12 is a diagram illustrating the construction of a receiving system for a CATV signal currently in use.

A first preferred embodiment of the present invention will now be described with reference to FIG. 1, which embodiment is for connecting a cable box 1 with a VCR 2. In FIG. 1, the same reference numerals will denote the parts previously described in FIG. 12, and detailed descriptions will be omitted.

In FIG. 1, a connecting portion 1CN for the cable box 1 and a connecting portion 2CN for the VCR 2 are shown. Nine types of signals can be inputted and outputted through the connecting portions 1CN and 2CN, which are connected with each other by a cable 4 having nine signal lines. Thus, the cable box 1 and the VCR 2 are linked to each other. An RF signal line 8 is provided to supply an RF signal directly to the VCR2 from the cable box 1 without going through the connecting portions 1CN or 2CN.

In this embodiment, of the nine signal lines of the cable 4, eight lines are used respectively as a serial clock line, a serial control data line, a data ground line, a video signal line, a video ground line, a left audio signal line, a right audio signal line, and an audio ground line. The remaining line is not used.

In FIG. 2, the serial clock line, the serial data line, and the data ground line formed as part of the cable 4 are connected via the connecting portion 1CN to a control microcomputer 13, which includes a memory 14 such as a RAM, in the cable box 1 and via the connecting portion 2CN to a control microcomputer 21 in the VCR 2.

The video signal line, the video ground line, the left audio signal line, the right audio signal line, and the audio ground line formed as part of cable 4 are connected via the connecting portion 1CN to a processor 16 for the audio signal and the video signal, referred to below as an AV signal processor, in the cable box 1 and via the connecting portion 2CN to an AV signal processor 22 in the VCR 2.

A predetermined channel output by the RF modulator 15 in the cable box 1, for example, the broadcasting signal of channel 3 or channel 4, is supplied on line 8 to an antenna terminal of the tuner 23 of the VCR 2. The AV signal processor 22 processes the output from the tuner 23, and the operations of tuner 23 and the AV signal processor 22 are controlled by the control microcomputer 21, which can include a memory 24 such as a RAM. An output from the tuner 12 in the cable box 1 is supplied to the AV signal processor 16, which processes the signal and provides audio and video signals.

As described above, the cable box 1 and the VCR 2 are linked to each other by the connecting portions 1CN and 2CN that are mutually connected by the cable 4, whereby the cable box 1 and the VCR 2 can be easily linked to each other. The control microcomputer 13 in the cable box 1 and the control microcomputer 21 in the VCR 2 can send and receive the control data back and forth through the serial data line and store such data in their respective memories, so that the microcomputer 21 in the VCR 2 can recognize the status of the cable box 1. Accordingly, the VCR 2 can control the cable box 1 completely, for example, to pre-set the video-recording operation.

Figure 3:
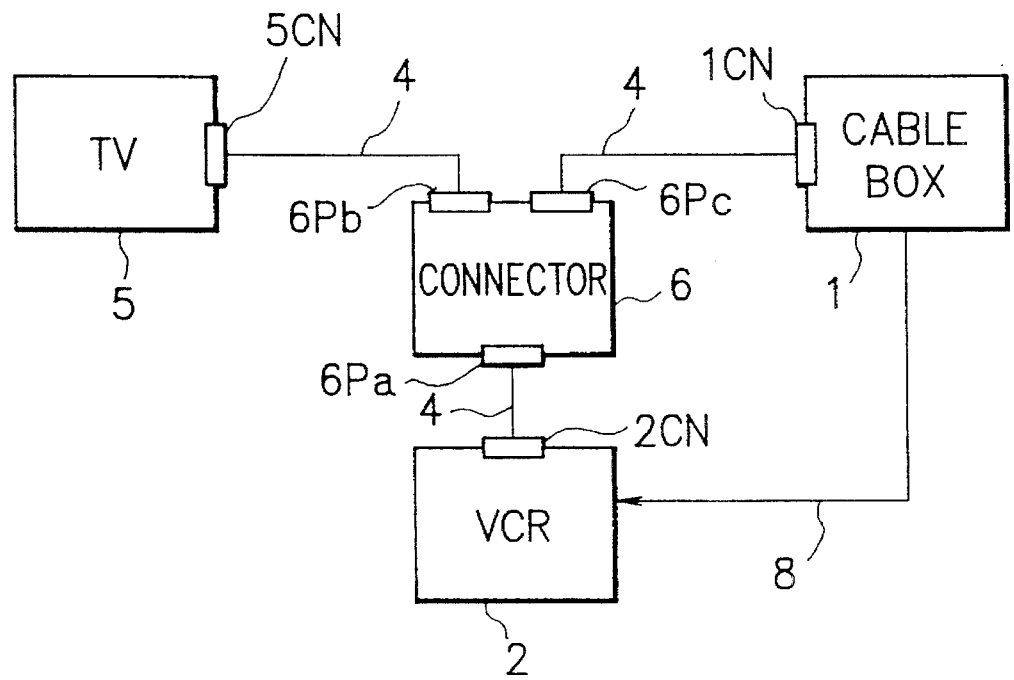
FIG. 3 is a diagram illustrating a second embodiment according to the present invention.

Another preferred embodiment of the present invention is described with reference to FIG. 3. This embodiment is for connecting the cable box 1, the VCR 2, and a television receiver 5. In FIG. 3, the same reference numerals will denote the parts previously illustrated in FIG. 1 and FIG. 12, and detailed descriptions will be omitted.

In the FIG. 3 embodiment, a television receiver 5 and connecting portion 5CN are included. Nine types of signals can be input and output through this connecting portion 5CN, similar to the connecting portions 1CN and 2CN. A connector 6 has three input/output ports 6Pa to 6Pc, to and from which nine types of signals can be input and output.

The port 6Pa in the connector 6 is connected to the connecting portion 2CN in the VCR 2 by the cable 4. Of the nine signal lines from the cable 4, eight lines are respectively used as a serial clock line, a serial control data line, a data ground line, a video signal line, a video ground line, a left audio signal line, a right audio signal line, and an audio ground line, and the one remaining line is used as a power supply line, for example, providing +5V, which supplies power to the connector 6.

The port 6Pb in the connector 6 is connected to the connecting portion 5CN in the television receiver 5 by the cable 4, and the port 6Pc is connected to the connecting portion 1CN in the cable box 1 by the cable 4 when only eight signal lines are used, and the one remaining line is not used, in a fashion similar to the cable 4 in FIG. 1.

Referring to FIG. 4, using the port 6Pa in the connector 6, the serial clock line, the serial data line, and the data ground line are connected via the connecting portion 2CN to the control microcomputer 21 in the VCR 2, while the video signal line, the video ground line, the left audio signal line, the right audio signal line, and the audio ground line are connected via the connecting portion 2CN to the AV signal processor 22 in the VCR 2. In FIG. 4, the power supply line for supplying power from the VCR 2 to the connector 6 is not shown.

Using the port 6Pc of the connector 6, the serial clock line, the serial data line, and the data ground line are connected via the connecting portion 1CN to the control microcomputer 13 in the cable box 1, while the video signal line, the video ground line, the left audio signal line, the right audio signal line, and the audio ground line are connected via the connecting portion 1CN to the AV signal processor 16 in the cable box 1.

Using the port 6Pb in the connector 6, the serial clock line, the serial data line, and the data ground line are connected via the connecting portion 5CN to a control microcomputer 51 in the television receiver 5, while the video signal line, the video ground line, the left audio signal line, the right audio signal line, and the audio ground line are connected via the connecting portion 5CN to an AV signal processor 52 in the television receiver 5. The television receiver 5 includes a tuner 53, the output of which is processed by the AV signal processor 52. The operations of the tuner 53 and the AV signal processor 52 are controlled by the control microcomputer 51, which can include a memory 54 such as a RAM.

Inside the connector 6, the serial clock line, the serial data line, and the data ground line are connected in common to each of ports 6Pa, 6Pb, and 6Pc. On the other hand, the video signal line, the video ground line, the left audio signal line, the right audio signal line, and the audio ground line are connected via a connection switch 61 between the ports 6Pa and 6Pb, via a connection switch 62 between the ports 6Pa and 6Pc, and via a connection switch 63 between the ports 6Pb and 6Pc. Further, the serial clock line, the serial data line, and the data ground line are connected to the control microcomputer 64, which can include a memory 65 such as a RAM, and which controls the on-off operation of the above-described connection switches 61 to 63. While only one switch is shown for convenience, it is understood that the switches have the appropriate number of poles to switch all of the necessary signal lines.

Each of the cable box 1, the VCR 2, and the television receiver 5 has a in-line package switch, or DIP switch, shown respectively at 17, 27, and 57. A user can set each unit of the equipment to its appropriate category; "master", which can control other equipment, or "slave", which cannot control other equipment and can determine priorities for the units of equipment that have been set to "master" using such DIP switch as 17, 27, and 57.

In FIG. 5, the numbers enclosed in parentheses for the "masters" category refer to the order of priority. The setting means is not limited to the in-line package switch and could as easily be accomplished with a menu display and a cursor. The microcomputer in one unit of electronic equipment, for example, the VCR 2 in FIG. 5, which is set as "master" (1) by the in-line package switch, requests data regarding category and type of equipment using the serial data line and receives from the control microcomputers of each of the other units of electronic equipment data regarding the category and type of equipment that is transmitted through the serial data line and stored in its memory. The microcomputer determines the addresses for each unit of electronic equipment, based on the data regarding its category, as shown for example in FIG. 5.

The address data for the electronic equipment set by the "master" (1) are transmitted through the serial data line to the other units of electronic equipment, and are stored in their memories, which form a part of each control microcomputer in the well-known arrangement. Thus, the "master" (1) electronic equipment can control the other electric equipment using such addresses.

The microcomputer in the electronic equipment acting as "master" (2), or (3), or (4), etc. stores in its memory the address data together with data regarding categories and types of equipment that are transmitted from the microcomputer of "master" (1). Thereafter, the unit of equipment designated "master" (2) can control the other electronic equipment using the address data during the scope of its operation without interfering with the control of any "master" equipment which is in a prior position to such "master" (2).

The electronic equipment acting as the "master" (1) determines the addresses respectively for the electronic equipment at a predetermined time, for example, the time at which the "master" (1) electronic equipment is turned on.

Figure 6:
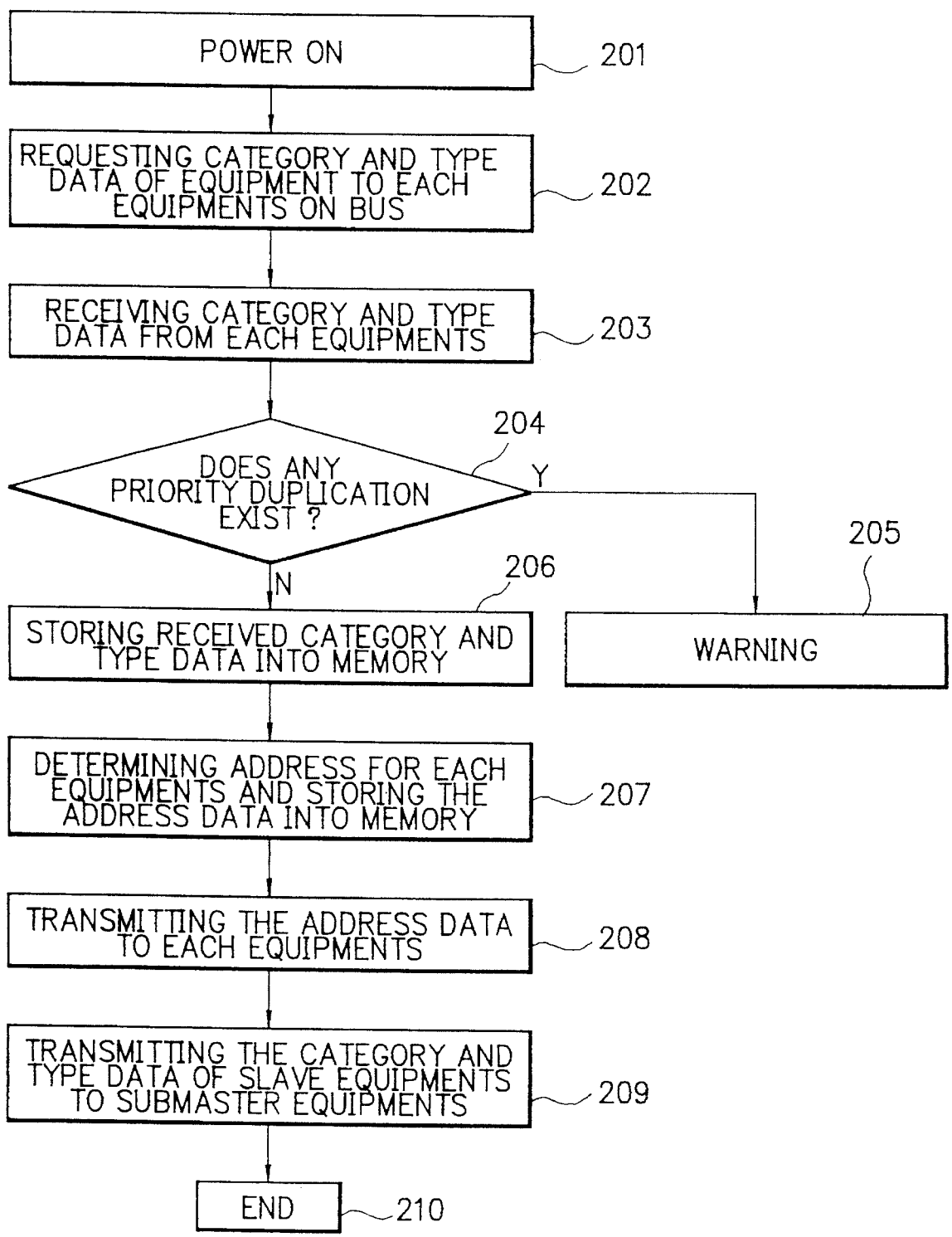
FIG. 6 is a flowchart showing an operation of the system of FIG. 3 when the VCR is the "master"

The initial operations performed by the control microcomputer in the unit designated as a "master" are shown in the flowchart of FIG. 6. These initial operations would be performed, for example, by the control microcomputer 21 of the VCR2 that is designated a "master". Each time the power for the VCR 2 is initially turned on in step 201 the initialization sequence is performed and the first step 202 of the control microcomputer 21 is to request category and type data for each unit of equipment that is connected in the system. In step 203 the microcomputer receives the category and type data from all of the units that were interrogated. It will be noted from FIG. 5 that there will be some duplication of category in the AV system. This only presents a problem where the duplication relates to the same priority number assigned to two or more master units. Therefore, step 204 checks the category data for duplication and, if found, step 205 provides an audible and/or visable warning to the system user. At that time, the user then resets the DIP switches on the relevant units to eliminate any such duplication.

When no duplication is found in step 205 the microcomputer proceeds to step 206 and stores the received category data and type data in the RAM 24 of the microcomputer 21. The microcomputer next in step 207 assigns an address to each unit of equipment in the AV system and also stores the assigned addresses in the RAM 24 of microcomputer 21. In step 208, the microcomputer of the master unit, which is this case in VCR 2, transmits the assigned address to each unit of equipment. As a final step 209, the microcomputer then transmits the category and type data to all the sub-master units, that is, all the units identified as master but with a priority that is not number one. The procedure then ends at step 210.

This interrogation and address assigning operation takes place each time the power for the VCR 2 is turned on. Therefore, even if various other units are added or subtracted to the AV system when the units are turned off, the system will nonetheless function correctly.

Figure 7:
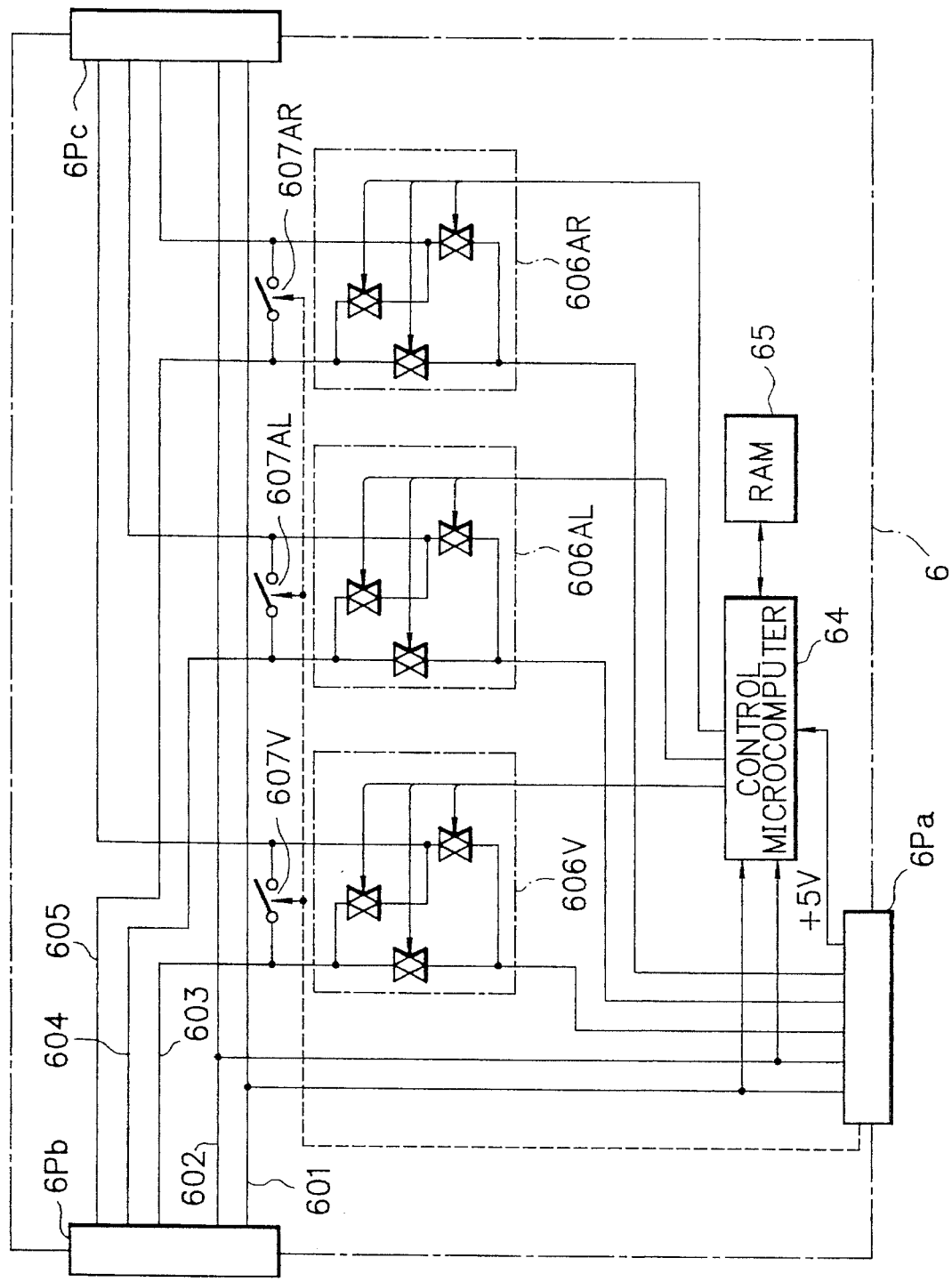
FIG. 7 is a diagram illustrating a construction of the connector used in the embodiment of FIG. 3.

A detailed construction of the connector 6 is illustrated in FIG. 7, where the same reference numerals denote parts corresponding to those illustrated in FIG. 4. In FIG. 7, reference numeral 601 denotes the serial clock line, reference numeral 602 denotes the serial data line, reference numeral 603 denotes the video signal line, reference numeral 604 denotes the left audio signal line, and reference numeral 605 denotes the right audio line. Reference characters 606V, 606AL, and 606AR respectively denote sets of switches for the video signal line 603, the left audio signal line 604, and the right audio signal line 605, and these sets of switches correspond respectively to the connection switches 61, 62, 63 in FIG. 4. Each of the sets of switches comprises three analog switches in which the on-off actions are controlled by the control microcomputer 64.

In addition to the switches 606V, 606AL, and 606AR, the video signal line 603, the left audio signal line 604, and the right audio signal line 605 are connected respectively through connection switches 607V, 607AL, and 607AR to the ports 6Pb and 6Pc. When no electronic equipment is connected to the port 6Pa or when the equipment connected to the port 6Pa is turned off so that the port 6Pa is not being used, the connection switches 607V, 607AL, and 607AR are automatically turned on or closed. That is, switches 607U, 607AL, and 607AR are normally closed.

For example, when the port 6Pa is not connected to the VCR 2, power cannot be supplied to the connector 6 from the VCR 2, so that the switches 606V, 606AL, and 606AR cannot connect the port 6Pb to the port 6Pc because the control microcomputer 64 is not powered. Instead, the connection switches 607V, 607AL, and 607AR connect the port 6Pb to the port 6Pc. This prevents the port 6Pb and the port 6Pc from being isolated from each other upon disconnecting equipment from port 6Pa.

Mechanical switches, which are mechanically turned on when no electric equipment is connected to the port 6Pa, can be used as the connection switches 607V, 607AL, and 607AR. Relay switches, which are turned on when no power is supplied to the connector 6 from the port 6Pa, can also be employed.

Although not shown, the data ground line is connected to each of the ports 6Pa to 6Pc, routed similarly to the serial clock line 601 and the serial data line 602, and the video ground line and the audio ground line are connected to the ports 6Pa to 6Pc, routed via switches in a fashion similar to the video signal line 603, the left audio signal line 604, and the right audio signal line 605.

In the construction described above, for example, the control microcomputer 21 in the VCR 2 supplies the control data to the control microcomputer 13 in the cable box 1 in order to direct the tuner 12 to select a predetermined channel. The control microcomputer 21 in the VCR 2 supplies the control data to the control microcomputer 64 in the connector 6 in order to turn the connection switch 62 on, so that the video and audio signals are supplied from the AV signal processor 16 in the cable box 1 through the connector 6 to the AV signal processor 22 in the VCR 2, where the signals are recorded.

As described above, the cable box 1, the VCR 2 and the television receiver 5 are connected with each other by the connecting portions 1CN, 2CN, and 5CN by the cable 4 and the connector 6 in this embodiment, so that the cable box 1, the VCR 2, and the television receiver 5 can be easily linked to each other. The control microcomputers in the cable box 1, the VCR 2, and the television receiver 5 can send and receive the control data back and forth through the serial data line of the cable 4, so that the microcomputer 21 in the VCR 2 can recognize the status of the cable box 1. Accordingly, the VCR 2 can control the cable box 1 completely for pre-set video-recording.

Figures 8, 9:
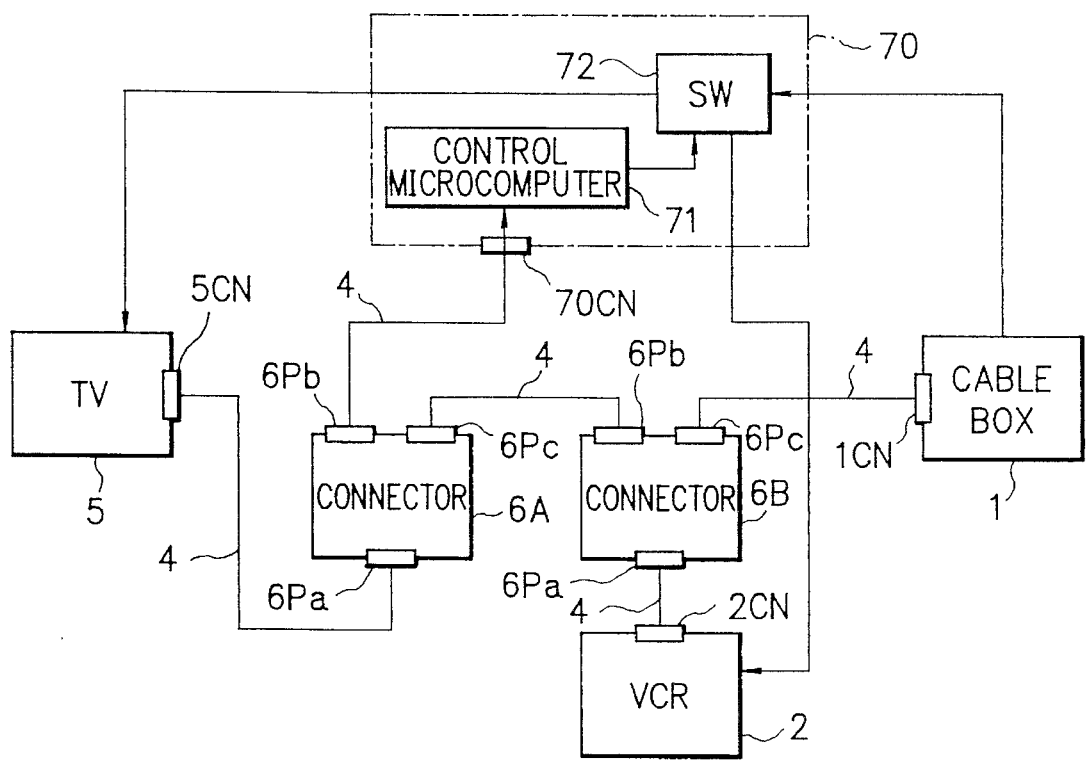
FIG. 8 is a diagram illustrating a third embodiment according to the present invention.
FIG. 9 is a diagram illustrating an example of the setting of categories and addresses in the third embodiment.

Another preferred embodiment of the present invention is described with reference to FIG. 8. This embodiment is for connecting the cable box 1, the VCR 2, a television receiver 5, and a switch block 70. In FIG. 8, the same reference numerals will denote the parts previously mentioned in FIG. 3, and detailed descriptions will be omitted.

In FIG. 8, connectors 6A and 6B are provided, each of which has three ports 6Pa to 6Pc in a fashion similar to the connector 6 shown in FIG. 3. Reference numeral 70 denotes the switch block, and reference character 70CN denotes a connecting portion. The switch block 70 has a control microcomputer 71 and a switch 72 inside and the switching operation is controlled by the control microcomputer 71, which can include a memory (not shown).

The port 6Pa in the connector 6A is connected to the connecting portion 5CN of the television receiver 5 by the cable 4. The port 6Pa in the connector 6B is connected to the connecting portion 2CN in the VCR 2 by the cable 4. Of the nine signal lines of the cable 4, eight lines are used respectively as a serial clock line, a serial data line, a data ground line, a video signal line, a video ground line, a left audio signal line, a right audio signal line, and an audio ground line, and the one remaining line is used as a power supply line.

The port 6Pb in the connector 6A is connected to the connecting portion 70CN in the switch block 70 by the cable 4. The port 6Pc in the connector 6A is connected to the port 6Pb in the connector 6B by the cable 4. The port 6Pc in the connector 6B is connected to the connecting portion 1CN in the cable box 1 by the cable 4. When only eight signal lines are required the one remaining line is not used, in a fashion similar to the cable 4 in FIG. 1. The control microcomputer 71 in the switch block 70 is connected through the connecting portion 70CN to the serial clock line, the serial data line, and the data ground line.

A broadcasting signal of a predetermined channel output from the RF modulator 15 in the cable box 1, as shown in FIG. 4, is supplied to the switch 72 in the switch block 70. The switch 72 selects the tuner 23 in the VCR 2 or the tuner 53 in the television receiver 5, as shown in FIG. 4, in order to supply the broadcasting signal. For example, in order to set the electric equipment to their appropriate categories in such situation, the VCR 2 is set as "master" (1), and the control microcomputer 21, shown in FIG. 4, in the VCR 2 determines the addresses that are shown in FIG. 9.

When the VCR 2 requests the broadcasting signal of the predetermined channel outputted from the RF modulator 15 in the cable box 1, the control microcomputer 21, shown in FIG. 4, provides control data to the control microcomputer 71 in the switch block 70, where the switch 72 selects the route to the VCR 2. The embodiment in FIG. 8 can also produce the same effect in its operation as that shown in FIG. 3.

Figure 10:
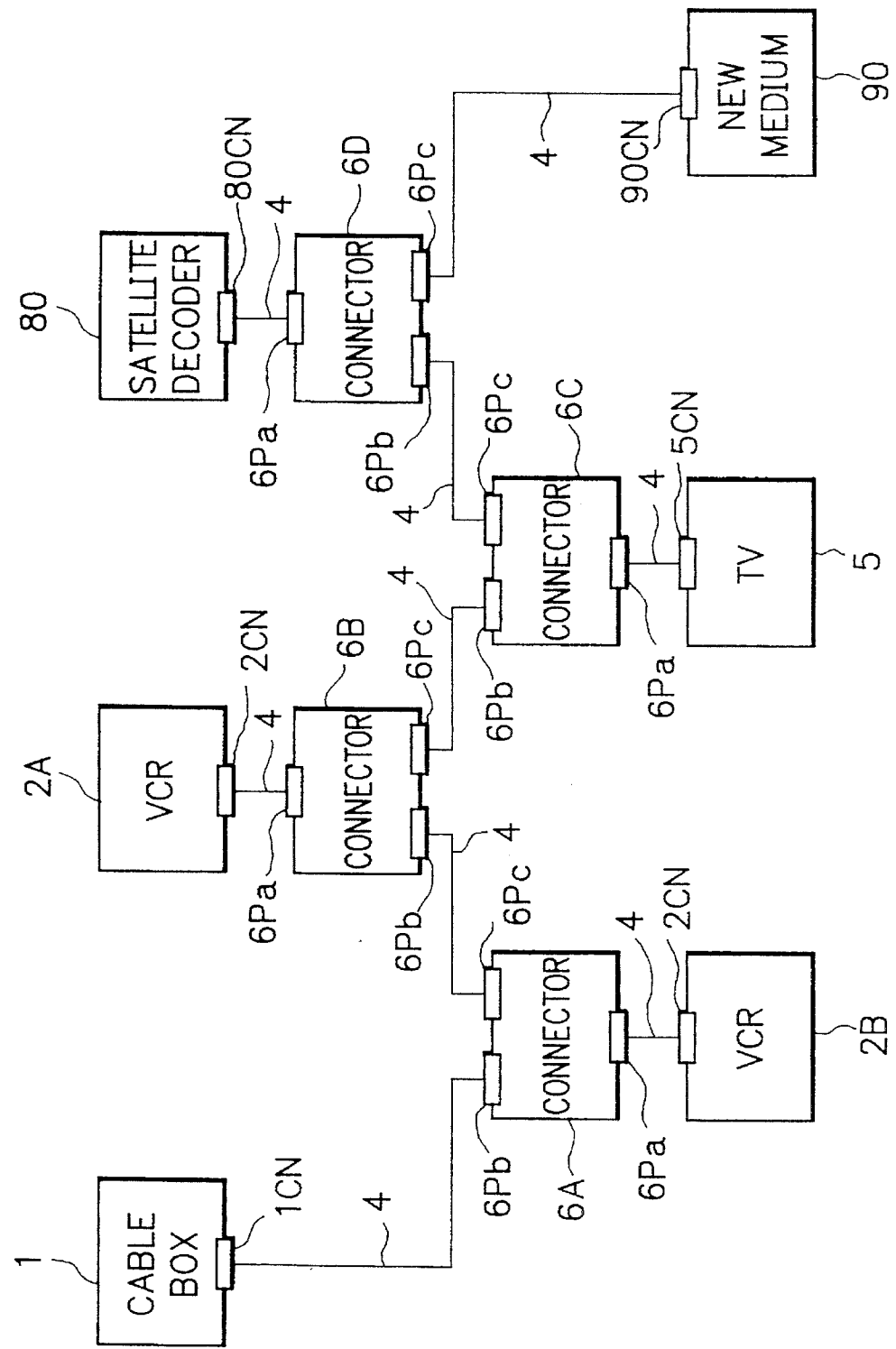
FIG. 10 is a diagram illustrating a fourth embodiment according to the present invention.

A still further embodiment of the present invention will now be described in reference to FIG. 10. In FIG. 10, the same reference numerals will denote the same parts previously mentioned in FIG. 3, and detailed descriptions will be omitted.

In FIG. 10, connectors 6A to 6D are provided, each of which has three ports 6Pa to 6Pc in a fashion similar to the connector 6 shown in FIG. 3. Reference characters 2A and 2B denote VCRs, each of which has the same construction as the VCR 2 in FIG. 3. Reference numeral 80 denotes a satellite decoder for decoding satellite broadcasting, and reference character 80CN denotes a connecting portion through which nine types of signals can be input and output. Reference numeral 90 denotes a new or different unit of electronic equipment such as a laser disc player or digital video disc (DVD) player, and reference character 90CN denotes a connecting portion through which nine individual types of signals can be input and output.

The port 6Pa in the connector 6A is connected to the connecting portion 2CN in the VCR 2B by the cable 4. The port 6Pa in the connector 6B is connected to the connecting portion 2CN in the VCR 2A by the cable 4. The port 6Pa in the connector 6C is connected to the connecting portion 5CN in the television receiver 5 by the cable 4. The port 6Pa in the connector 6D is connected to the connecting portion 80CN in the satellite decoder 80 by the cable 4. Of the nine signal lines of the cable 4, eight lines are used respectively as a serial clock line, a serial data line, a data ground line, a video signal line, a video ground line, a left audio signal line, a right audio signal line, and an audio ground line, and the one remaining line is used as a power supply line.

The port 6Pb in the connector 6A is connected to the connecting portion 1CN in the cable box 1 by the cable 4. The port 6Pc in the connector 6A is connected to the port 6Pb in the connector 6B by the cable 4. The port 6Pc in the connector 6B is connected to the port 6Pb in the connector 6c by, the cable 4. The port 6Pc in the connector 6C is connected to the port 6Pb in the connector 6D by the cable 4. The port 6Pc in the connector 6D is connected to the connecting portion 90CN in the new medium 90 by the cable 4. Of the nine signal lines of these cables 4, only eight lines are used and the one remaining line is not used, in a fashion similar to the cable 4 in FIG. 1.

For example, in order to set the electronic equipment to their appropriate categories in such situation, the VCR 2A is set as "master" (1), and the control microcomputer 21, shown in FIG. 4, in the VCR 2A determines the addresses as shown in FIG. 11. This embodiment can produce the same effect in its operation as the one in FIG. 3.

According to the present invention, each unit of electronic equipment has a connecting portion for connecting it to the other units in order to input and output information data and control data, so that the units of equipment are easily linked to each other. The electronic equipment can send and receive the control data, so that one unit of the electronic equipment can easily share information and control data with the other units, and, in addition, such one unit of electronic equipment can recognize the status of and control the other units completely.

Also according to the present invention, a unit of electronic equipment can set each other unit of electronic equipment in either the category, "master", which can control other equipment, or "slave", which cannot control the other equipment. Moreover, each unit of electronic equipment set as "masters" can be set to have an order of priority, so that when a number of units of electric equipment are connected together, the relationship of "master" and "slave" will be clear, and it will be possible to avoid confusion concerning control of the electronic equipment.

In addition, the categories and the priorities are determined through an in-line package switch (DIP switch), so that it is possible to set these manually and visually avoid duplication of the categories or priorities. Furthermore, a "master" item of equipment with the highest priority determines the addresses for a number of units of electronic equipment using a cable, in reference to the categories and the priorities for the other equipment, so that it is possible to handle a number of units of equipment using appropriate addresses. Also, the user is warned of duplication in the order of priority for the electronic equipment and quickly understands his or her error in setting the priorities.

According to the present invention, a connector has the first to third input/output ports and a switch means for connecting any two of the first to third input/output ports, so that more than three units of electronic equipment can be connected with each other by using more than one connector. When one of the first to third input/output ports is not actually used, the two other input/output ports are connected with each other, so that the two other input/output ports are prevented from being isolated.

According to the present invention, each unit of electronic equipment has a connecting portion for inputting and outputting the information signals and control data, and the connecting portions of the electronic equipment are connected with each other by a cable and a connector. The connector has first to third input/output ports and a switching means for connecting any two of the first to third input/output ports, so that more than three units of electronic equipment can be connected with each other by using more than one connector.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A method for controlling a plurality of units of electronic equipment in which one of the units is designated a master unit and in which the plurality of units are connected together by at least one cable that transmits video, audio, and control signals, comprising steps performed by the master unit of:

detecting kinds of electronic equipment connected to the master unit via the cable;

assigning individual addresses for each of the units of electronic equipment;

storing data of the detected kinds of electronic equipment and the assigned individual addresses in a memory of the master unit;

transmitting the assigned address data from the master unit to the respective memories in the other units of electronic equipment.

2. A method for controlling a plurality of units according to claim 1, further comprising:

designating more than one of the units as a master unit; and assigning a numerical priority among the designated master units.

3. A method for controlling a plurality of units according to claim 2, further comprising:

checking the assigned numerical priority among the designated master units to determine whether any duplication exits and providing a warning indication to a user upon finding a duplication.

4. A method for controlling a plurality of units according to claim 2, further comprising transmitting the data of the detected kinds of electronic equipment to all units designated as master units.

5. A method for controlling a plurality of units according to claim 2, wherein the step of designating includes manually actuating an in-line switch arranged on a respective unit of electronic equipment.

6. A method for controlling a plurality of units according to claim 1 further comprising performing all of said steps of detecting, assigning, storing, transmitting, and storing every time power is turned on in the master unit.

7. Apparatus for connecting a plurality of units of electronic equipment to a device receiving incoming audio and video signals, comprising:

- a plurality of controllers arranged respectively in each of said plurality of units;
- a terminal unit connected to the respective controller in each of said units;
- connector means having a first port for connection to the device and second and third ports for connection to a respective terminal unit of two of said plurality of units and having a control microcomputer; and
- a plurality of multi-conductor cables connecting the device to said connector means, and said second and third ports to said two units,
- wherein said connector means includes a plurality of switch units for switchably connecting said audio and video signals among said first, second, and third ports under control of said control microcomputer.

8. Apparatus for connecting a plurality of units according to claim 7, wherein said audio signals includes left and right audio signals and said plurality of switch units include first, second, and third sets of three switches each for respectively connecting said video signal, said left audio signal, and said right audio signal among said first, second, and third ports.

9. Apparatus for connecting a plurality of units according to claim 8, wherein said second port provides an energization voltage to the connector means and to the control microcomputer thereof.

10. Apparatus for connecting a plurality of units according to claim 9, further comprising first, second, and third switches each connected respectively in series in a video line a left audio line, and a right audio line connected between said first port and said third port.

11. Apparatus for connecting a plurality of units according to claim 10, wherein said first, second, and third switches are normally closed switches and are actuated to open upon the presence of the energization voltage at the second port.

12. A controller for connecting at least a video signal, a left audio signal, and a right audio signal from first electronic equipment to second electronic equipment and to third electronic equipment, comprising:

- first, second, and third ports connected respectively to said second electronic equipment, said third electronic equipment, and said first electronic equipment;
- a control microcomputer connected to each of said first, second, and third ports through data lines;
- first, second, and third sets of switches for connecting said video signal, said left audio signal, and said right audio signal, among said first, second, and third ports under control of said control microcomputer; and
- first, second, and third normally closed switches each in series with a video line, a left audio line, and a right audio line connecting said second and third ports,
- wherein when an energization voltage is applied to said first port said first, second, and third normally closed switches are opened and said first, second, and third ports are operably connected to each other through said first, second, and third sets of switches.

* * * * *

UNITED STATES PATENT AND TRADEMARK OFFICE
CERTIFICATE OF CORRECTION

PATENT NO. :     5,541,670
DATED       :     July 30, 1996
INVENTOR(S) :    Tomoyuki HANAI It is certified that error appears in the above-identified patent and that said Letter Patent is hereby corrected as shown below:

Col. 9, line 35, after "by" delete ","

<u>In the claims:</u>

Col.12, line 7, after "line" insert --,--

Signed and Sealed this

Seventh Day of October, 1997

*Attest:*

BRUCE LEHMAN

*Attesting Officer*      *Commissioner of Patents and Trademarks*